: 3,532,216
APPARATUS FOR PROCESSING MATERIALS
James F. Zievers, La Grange, and Allen E. Cederholm, Western Springs, Ill., assignors to Industrial Filter & Pump Mfg. Co., Cicero, Ill., a corporation of Illinois
Filed Sept. 22, 1969, Ser. No. 859,891
Int. Cl. B01d 29/24
U.S. Cl. 210—95                                                9 Claims

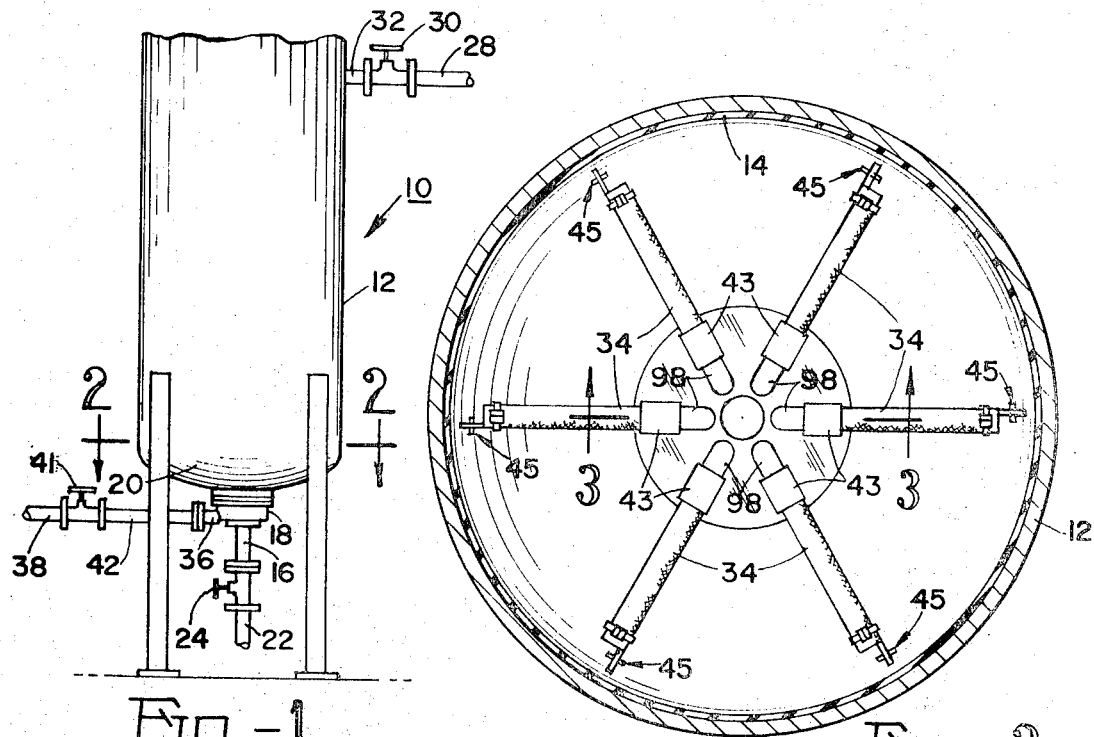
Fig.-1
Fig.-2
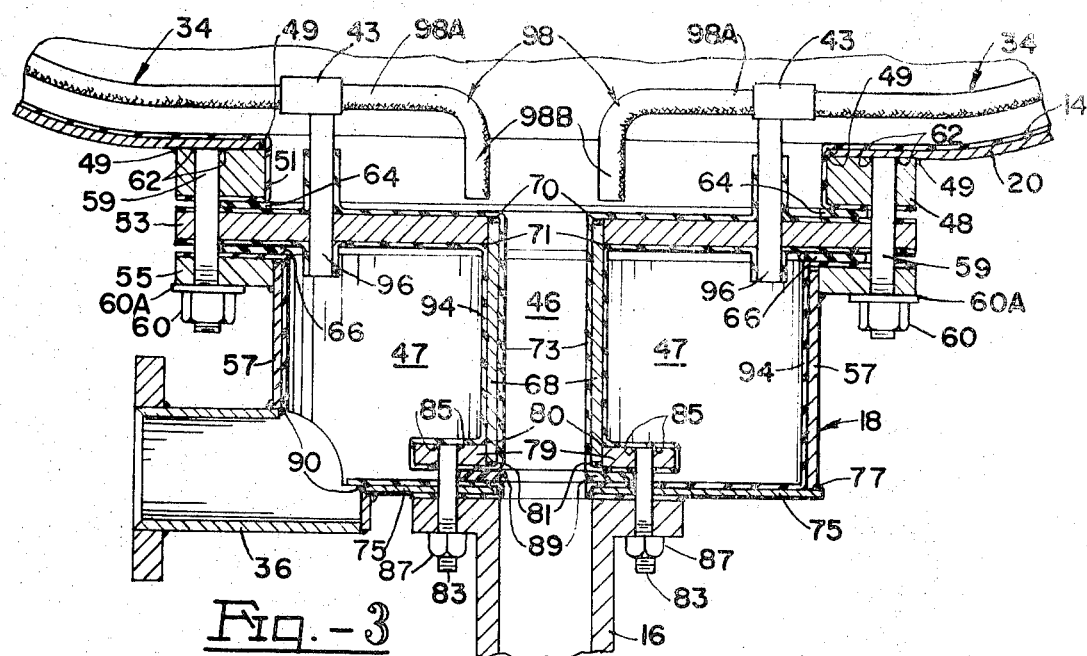
Fig.-3
INVENTORS
JAMES F. ZIEVERS
ALLEN E. CEDERHOLM
BY Fidler, Bradley & Patnaude
Att'ys.

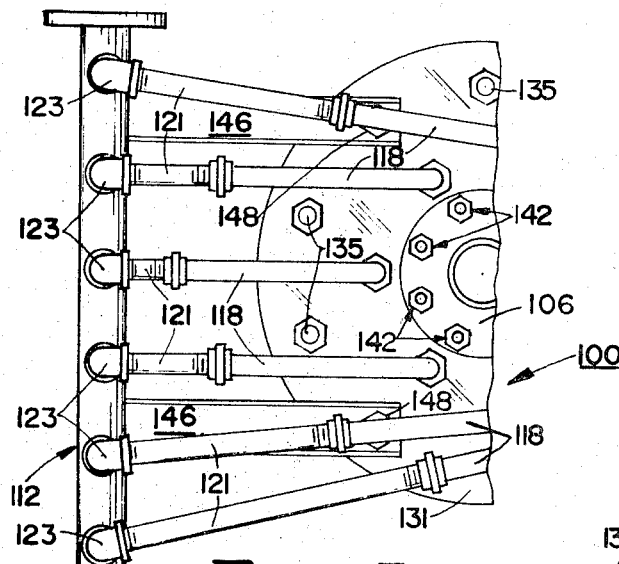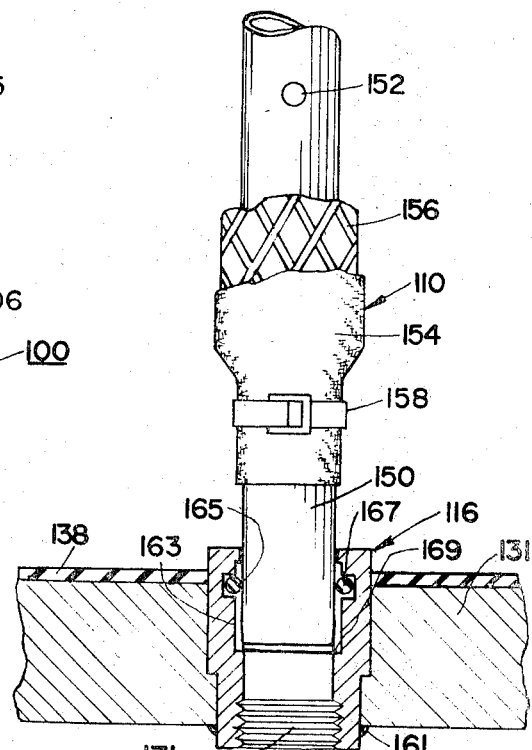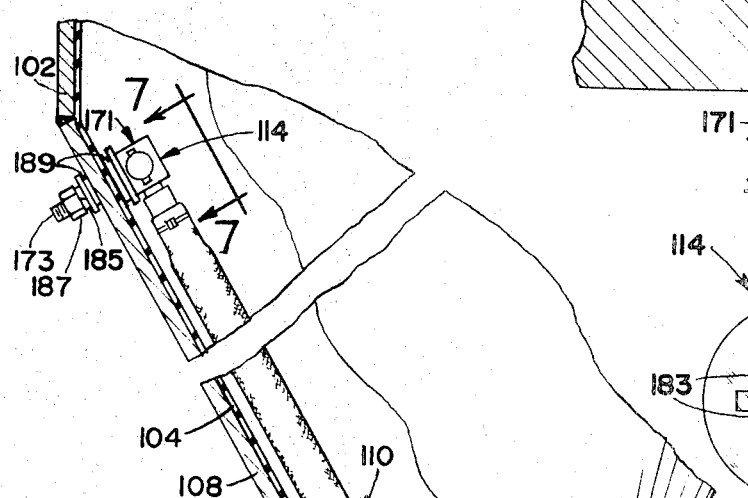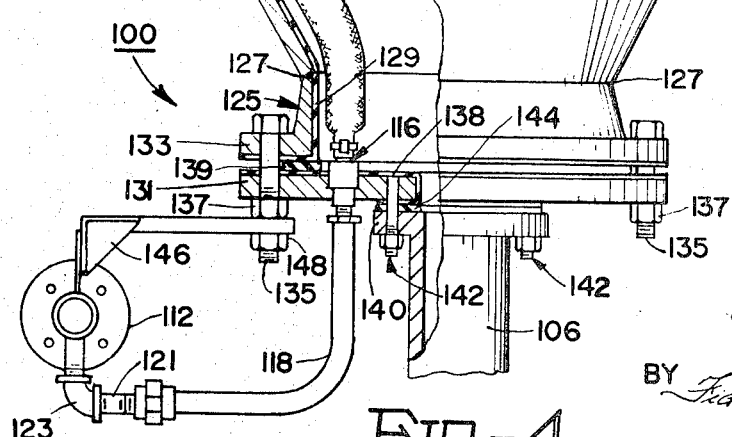

ABSTRACT OF THE DISCLOSURE

Apparatus for processing materials by an ion exchange process or the like includes a manifeld assembly which is adapted to be mounted on the outside of a material processing vessel, and a plurality of perforated conduits which are adapted to be mounted at the interior of the vessel in fluid communication with the manifold for conveying fluids under pressure to and from the vessel. The manifold assembly includes a plate which is adapted to be attached in sealing engagemen to the outside of the bottom wall of the tank over an opening therein. When the plate is attached to the tank, the conduits are detachably connected to a series of connectors mounted on the plate and extend radially from the plate inside the interior of the tank near its bottom wall toward its side walls. The manifold assembly includes a chamber which is connected in fluid communication with the conduits.

---

The present invention relates to an apparatus for processing materials, and it more particularly relates to a drain and feed apparatus which is adapted to be detachably mounted to a new or existing processing vessel so that radially-extending drain and feed conduits can be used at the interior of the processing vessel.

In the past, various different types of apparatus have been employed for processing materials. According to one successful technique, a regeneration system has employed powdered or granulated resinous materials for regenerating materials by an ion exchange process. Apparatus of this type is disclosed in a copending U.S. patent application, Ser. No. 664,525, filed on Aug. 30, 1967. With this type of processing apparatus, there is provided a material processing vessel which includes a tank having a sloping bottom wall terminating in a lowermost material feed opening, and a fluid drain and feed means which includes a chamber disposed near the material feed opening and a plurality of perforated conduits communicating with the chamber and extending radially from the chamber along the bottom wall of the tank at the interior thereof. The feed conduits can be used in certain operations to collect fluid flowing through the material, and in other operations they can be used to supply fluid to the material contained in the vessel. The material feed opening is used to supply or withdraw processing material, such as the resin, from the tank. Since this type of processing apparatus has proved to be extremely successful and is widely used in the industry at the present time, it would be highly desirable to be able to convert existing processing vessels employing other types of conduits to a radial-conduit system. Moreover, it would be desirable to have a drain and feed apparatus which could be installed at the location of an existing processing vessel without the necessity of disassembling the entire vessel, and which can be disassembled from the vessel for repair or replacement purposes.

Therefore, it is the principal object of the present invention to provide a new and improved apparatus for processing materials.

Another object of the present invention is to provide a new and improved drain and feed apparatus in the form of an attachment for a processing vessel to convert the vessel to a radial-conduit system without the necessity of disassembling the entire vessel.

Briefly, the above and further objects are realized in accordance with the present invention by providing a drain and feed apparatus which includes a plurality of perforated conduits adapted to be mounted at the interior of a processing vessel and a manifold assembly adapted to be connected in fluid communication with the conduits and to be mounted on the outside of the bottom wall of the vessel over an opening therein. The manifold assembly includes a plate which is adapted to be attached in sealing engagement to the outside of the bottom wall over the opening therein. A plurality of connectors are mounted on the plate so that once the plate is assembled to the bottom of the vessel, the conduits can then be readily mounted on the plate. The manifold assembly also includes a chamber which is connected in fluid communication with the connectors and thus to the conduits.

These and futrher objects of the present invention will be understood more fully and completely from the following detailed description when considered with reference to the accompanying drawings, wherein:

FIG. 1 is a fragmentary elevational view of a processing vessel employing principles of the present invention;

FIG. 2 is an enlarged cross-sectional view of the vessel of FIG. 1 taken substantially along the line 2—2 thereof;

FIG. 3 is a greatly enlarged, fragmentary vertical cross-sectional view of the vessel of FIG. 2 taken substantially along the line 3—3 thereof;

FIG. 4 is a fragmentary view of a bottom portion of another processing vessel embodying principles of the present invention, portions of the vessel being broken away and showing only one of the radial conduits for illustration purposes;

FIG. 5 is a fragmentary view of the underside of the vessel shown in FIG. 4;

FIG. 6 is an enlarged cross-sectional, fragmentary view of the lower end of the conduit and its connector of FIG. 4; and FIG. 7 is an enlarged fragmentary view of a hold-down clamp for the upper end of the conduit of FIG. 4 taken substantially along the line 7—7 thereof.

Referring now to FIG. 1, there is shown a material processing vessel 10 which may be used for processing materials by a process, such as an ion exchange process. The vessel 10 may incorporate the principles of the present invention and includes a cylindrical tank 12 having a rubber lining 14 (FIG. 2). While the top (not shown) may be open to the atmosphere for some applications, ordinarily it is sealed by a suitable cover so that operation above or below atmospheric presure is possible. For the purpose of transferring the processing material, such as granulated resin, into and out of the tank 12, a material feed pipe 16 is connected to an annular manifold assembly 18 which in turn is connected to the central portion of a dish-shaped bottom wall 20 over an opening therein. A suitable material transfer apparatus (not shown) communicates with the pipe 16 through a pipe 22 and a drain valve 24. The transfer apparatus can, for example, withdraw the resins from the tank 12 and transfer them to a suitable storage or further stages of the process. The transfer apparatus can also be used to convey fluid entrained granulated resins for treating purposes through the pipes 22 and 16 into the tank 12.

Referring now to FIGS. 1, 2 and 3 of the drawings, for the purpose of supplying fluids under pressure to the material in the tank 12, a pipe 28 is connected through a valve 30 to a conduit 32 near the top of the tank 12 above the material contained therein. As shown in FIG. 2, a series of radially-extending conduits 34, which are similar to the radial conduits disclosed in the above-mentioned co-pending application, Ser. No. 644,525, filed on Aug. 30, 1967, are disposed near the bottom wall 20 at the interior of the tank 12 and are connected in fluid communication with the manifold assembly 18 to convey fluids passing through the material from the tank 12 or for feeding fluid thereto depending upon the process being carried out. While the conduits 34 are shown to be spaced from the bottom wall 20 by a substantial distance for illustration purposes, the conduits 34 are ordinarily spaced by only a short distance from the bottom wall 20 since the heavy processing material within the tank 12 could otherwise bend or damage the conduits 34. A port 36 of the manifold assembly 18 is connected to a pipe 38 via a valve 41 and a pipe 42 for conveying fluids to and from the manifold assembly 18.

In operation, in accordance with one type of operation for treating fluids, the valve 30 and the valve 41 are first opened, and the fluid to be treated is conveyed under pressure through the pipe 28 into the conduit 32 of the tank 12. The fluid is thus passed through the processing materials in the tank 12 and into the perforated conduits 34. The treated fluid is then conveyed from the conduits 34 to the pipe 38 via the port 36 of the manifold 18. In order to regenerate the processing materials, such as resins, the upper valve 30 is closed and then the lower valve 41 is closed. After connecting the pipe 28 to a suitable supply of rinsing liquid, such as water under pressure, the valves 30 and 41 are then opened, and the materials in the tank 12 are rinsed by conveying the water under pressure through the material and out the conduits 34 to the pipe 38 via the valve 41. Once the water leaving the pipe 38 becomes clear, the valves 30 and 41 are closed, and then the supply of water under pressure is connected to the pipe 38. After opening the valves, the processing materials in the tank 12 are then backwashed by means of the water under pressure which is conveyed in the reverse direction through the conduits 34 to fluff up the processing materials. The valves are then closed, and a regenerating fluid under pressure is then conveyed through the pipe 28 in the forward direction to regenerate the processing materials. After regenerating the materials, the water under pressure is then conveyed in the reverse direction through the tank 12 as in the backwashing operation to remove any remaining regenerating fluid from the processing materials. Thereafter, in some applications, a relatively small amount of the liquid to be treated, or a liquid which is chemically similar to the liquid to be treated, is first diluted with water, and then conveyed under pressure in the forward direction through the tank 12 to prime the processing material. This priming operation is necessary in some applications where the strong undiluted liquid to be treated would chemically adversely affect the freshly-regenerated processing material. After the regenerating process, the filter 10 may be returned to the line for processing the fluid to be treated.

Considering the conduits 34 in greater detail with reference to FIGS. 2 and 3 of the drawings, the conduits 34 extend radially with respect to the axis of the material feed pipe 16 and generally conform to the adjacent portion of the sloped bottom wall 20. A series of T connectors 43 connect the conduits 34 in fluid communication with the manifold 18. The conduits 34 are perforated throughout their length and are surrounded by a fine mesh sleeve to prevent the resinous materials from entering the perforations. The upper ends of the conduits 34 are closed and are clamped to the bottom wall 20 of the tank 12 by means of a series of hold-down clamps 45.

Referring now to FIG. 3, the manifold assembly 18 is generally cylindrical in shape and fits over an opening in the bottom wall 20 at the lower most area thereof. The manifold assembly 18 includes a centrally-disposed passageway 46 which communicates with the pipe 16, and an annular chamber 47 which surrounds the passageways 46 and communicates with the port 36 and the conduits 34. In order to mount the manifold to the bottom wall 20 of the tank 12, the manifold assembly 18 includes a flat, annular reinforcing plate or ring 48 which is fixedly connected and sealed to the bottom wall 20 by way convenient means such as by annular welds 49 on the inside and outside of the tank 12. The annular plate 48 is aligned with the opening in the bottom wall 20, with the inside diameter of the annular plate 48 being approximately the same size as the diameter of the opening in the bottom wall 20. The inner periphery and the underside of the annular plate 48 may be provided with a rubber lining 51 to prevent the plate 48 from chemically interacting with the fluids in the tank 12. Connected to the underside of the ring 48 is a flat annular plate or ring 53 which forms the top wall of the annular chamber 47, and an annular plate 55 which underlies the outer periphery of the plate 53 and which surrounds and forms an outer flange at the upper end of the cylindrically-shaped tubular sidewall 57 of the annular chamber 47. A series of threaded studs 59 extend from the underside of the plate 48 through aligned holes in the plate 53 and the annular plate 55, and a series of nuts 60 and washers 60A are secured to the ends of the studs 59. The studs 59 extend through holes in the plate 48 and are fixed thereto by means of annular wells 62. For sealing purposes, a gasket 64 is interposed between the plate 48 and the plate 53, and a gasket 66 is interposed between the plate 53 and the annular plate 55.

A cylindrically-shaped tubular inner wall 68 which is concentric with and spaced from the outer wall 57 defines the passageway 46. The opening in the plate 53 is aligned with the inner wall 68 and the feed pipe 16, and is connected and sealed to the inner wall 68 by any suitable technique, such as the annular welds 70 and 71, at the opening in the plate 53. The inside of the inner wall 68 is provided with a protective rubber lining 73, and the inside diameter of the inner wall 68 is approximately the same as the inside diameter of the feed pipe 16 and the diameter of the opening in the plate 53.

A botom centrally-apertured wall 75 is fixedly connected to the outer wall 57 by an annular weld 77. A flat annular reinforcing plate 79 surrounds the lower end of the inner wall 68 and is fixedly connected thereto by means of the annular welds 80 and 81. A series of threaded studs 83, which are fixed to the plate 79 by any suitable means such as the welds 85, extend through aligned holes in the plate 79 and the bottom wall 75 so that the outlet pipe 16 can be fastened to the bottom wall 75 and held in place by the nuts 87 threaded on the ends of the studs 83. For sealing purposes, a gasket 89 is interposed between the plate 79 and the bottom wall 75. If desired, a gasket (not shown) can also be placed between the bottom wall 75 and the pipe 16. The outlet 36 for the manifold 18 is fixedly connected and sealed to the sidewalls 57 and the bottom wall 75 over an opening therein by any suitable means such as the annular welds 90 on the outside and the inside of the outlet 36. In order to protect the walls of the chamber 92 from chemically interacting with the fluids in the chamber, the inside of the outer wall 57, the outside of the inner wall 69, the inside of the top wall 53, and the inside of the bottom wall 75 and the outside thereof adjacent the pipe 16 are provided with a rubber lining 94. In accordance with another embodiment of the present invention, the walls defining the chamber 47 and the passageway 49 are alternatively composed of a transparent plastic material, such as Lucite, so that the manifold assembly 18 serves as a sight glass. Also, by using transparent materials for the manifold assembly, should one of the conduits 34 become faulty during use, the malfunctioning or inoperative conduit is readily observable and identifiable so that repair or replacement is simplified.

For the purpose of connecting the conduits 34 in fluid communication with the annular chamber 47, a plurality of pipes 96 extend through openings in the top wall 53 of the chamber 47 and are detachably connected in fluid communication to the T connectors 43. The conduits 96 are fixed to the top wall 53 by any suitable technique, such as by welding the pipes 96 to the plate 53 and then grinding the welds to provide a smooth finish. A protective rubber lining 99 is provided on the upper face of the plate 53 and extends onto a portion of the outer surface of the pipes 96.

In order to insure that the fluids located in the "dead" space in the tank 12 above the top wall 53 and below the conduits 34 are treated or removed during a treating or regenerating cycle, a series of L-shaped perforated conduits 98, which are similar to the conduits 34, are connected in fluid communication to the T connectors 43 and are disposed in the dead space. Each conduit 98 comprises a horizontal portion 98A which is connected to the T connector 43, and a vertical portion 98B which terminates in its closed end near the passageway 74.

In order to mount the conduits 34 in the tank 12 and the manifold assembly 18 to the bottom wall 20 of the tank 12, assuming that the tank 12 was originally provided with a different type of drain and feed means, a circular opening is first cut in the center of the bottom wall 20, the opening being slightly larger in diameter than the inside diameter of the annular plate 48. The manifold 18 is then mounted to the bottom wall 20 by first welding the plate 48 to the outside of the bottom wall 20 in alignment with the opening therein. The apertured plate 53 and the flange 55 are then slipped over the ends of the studs 83 extending from the plate 48 and are fixed to the plate 48 by the nuts 60 and the washers 60A. The pipe 16 is then connected to the bottom wall 75 in fluid communication with the passageway 46, and the pipe 42 is connected to the port 36.

The radial conduits 34 are then connected to the T connectors 43 at the interior of the tank 12, the conduits 98 having been previously connected to the T connectors 43 prior to mounting the manifold assembly 18 to the tank 12. The clamps 45 are then fastened to the inside of the bottom wall 20 at the appropriate locations so that the upper ends of the conduits 34 can then be clamped in place.

Referring now to FIGS. 4, 5, 6 and 7, there is shown a processing vessel 100 which also embodies the principles of the present invention. The processing vessel 100 is similar to the processing vessel 10 of FIG. 1 except that the processing vessel 100 has a conically-shaped bottom wall instead of a dish-shaped bottom wall. The processing vessel 100 includes a cylindrically-shaped tank 102 having a rubber lining 104. For the purpose of transferring the processing material into and out of the tank 102, a feedpipe 106 is connected to the central portion of a conically-shaped bottom wall 108. Fluids are conveyed into and out of the tank 102 near the top thereof in the same manner as the tank 12 of FIG. 1. A plurality of radially-extending perforated conduits, such as the conduit 110 (FIG. 4), are disposed at the interior of the tank 102 at the bottom wall 108 thereof and are connected in fluid communication with a manifold 112 mounted on the exterior of the vessel 100. If a substantially larger number of conduits, such, for example, as sixteen, were employed, then two manifolds would be used and mounted on opposite sides of the tank 102.

The upper closed end of the conduits 110 are clamped to the bottom wall 108 by means of a series of hold-down clamps, such as the clamp 114. The lower end of the conduits are detachably connected to a connector 116 which in turn is connected to a flexible conduit 118 at the exterior of the tank 102. Each of the conduits 118 is connected in fluid communication to the manifold 112 through a pipe 121 and an elbow connector 123.

Considering now the manner in which the bottom end portion of the tank 102 is constructed, with reference to FIGS. 4 and 5 of the drawings, an annular plate 125 is fixedly connected to the central portion of the bottom wall 108 over an opening therein. The plate 125 is welded to the bottom wall 108 by means of the annular weld 127. In order to protect the plate 125 from the chemicals in the tank 102, the inner periphery and the underside of the plate 125 are provided with a rubber lining 129. An annular plate 131 is sealably connected to a peripheral flange 133 of the plate 125 by means of a series of bolts 135 which extend through alinged openings in the flange 133 and the plate 131 and are held in place by means of the nuts 137 threaded on the bolts 135. The upper surface and the inner periphery of the plate 131 are provided with a rubber lining 138. For sealing purposes, a gasket 139 is interposed between the flange 133 and the plate 131. A flange 140 of the pipe 106 is connected to the plate 131 in axial alignment with the opening therein by means of a series of threaded studs and bolts at 142 in the same manner as the outlet pipe 16 of FIG. 3 is connected to the bottom wall 75. A gasket 144 is interposed between the flange 140 and the plate 131 for sealing purposes. For the purpose of supporting the manifold 112, a bracket 146 is connected to the manifold 112 and is secured to the bolts 135 by means of nuts 148.

Considering now the conduits 110 and the connectors 116 in greater detail with particular reference to FIG. 6, the radial conduits 110 are similar to the conduits 34 of FIG. 2, and each comprises a pipe 150 which is perforated throughout its length with a series of holes such as the hole 152, an outer fine mesh sleeve 154 which is composed of either a fabric material or a fine mesh screen, and a coarse mesh plastic sleeve 156 which is interposed between the outer sleeve 154 and the pipe 150 for spacing purposes. The sleeve 156 is a grid of tubular construction and is formed of an extruded thermoplastic material, which is sold by E. I. du Pont de Nemours & Co., under the trademark "Vexar." The lower end of the outer sleeve 154 extends beyond the end of the spacer sleeve 156 by a short distance and is directly clamped to the pipe 150 by means of a strap and buckle 158. The connector 116 is generally tubular in shape and extends through a complementally shaped opening in the plate 131. The connector 116 is fixedly connected to the plate 131 by means of an annular weld 161 at the outside of the plate 131. In order to quickly and easily insert the end of the conduit 150 into the connector 116, an outer enlarged bore 163 receives the end of the pipe 150 and a resilient O-ring 165 fits in a peripheral groove 167 in the inner wall of the connector 116 to seal the pipe 150 to the connector 116. The end of the connector 150 is seated against an internal shoulder 169 of the connector 116. The outer end of the connector 116 is threaded into an outer threaded opening 171 of the connector 116 which communicates with the bore 163. The above-described, readily-detachable connection between the conduit 110 and the connector 116 can also be employed as the detachable connection between the conduit 34 and the T connector 43 of FIG. 3.

Referring now to FIG. 7, the hold-down clamp 114 includes a stud member 171 having a threaded shank 173 which extends through a hole which is drilled in the bottom 108 of the tank 102 at the appropriate location after connecting the lower ends of the conduits 110. An upstanding lug 175 on the stud member 171 is adapted to be connected to an ear 177 extending from the closed end of the conduit 150 by means of a bolt 179 which extends through aligned openings in the lug 175 and the ear 177 and is secured in place by means of a nut 181 and a pair of washers 183. As shown in FIG. 4, a lock washer 185 and a nut 187 on the outside of the tank 102 fasten the stud member 171 to the bottom wall 108. For sealing purposes, a pair of gaskets 189 surround the shank 173 and are disposed on the inside and the outside of the tank 102. The above-described hold-down clamp 114 can also be employed as the hold-down clamp 45 of FIG. 2.

In view of the foregoing description of the disclosed embodiments of the present invention, it should now be apparent that the apparatus of the present invention includes a plate which is adapted to be attached in sealing engagement to the outside of the bottom wall of a tank, and which has a plurality of connectors mounted on and extending through the plate. A plurality of perforated conduits are adapted to be connected in fluid communication with the connectors at the interior of the tank, and when connected, the conduits extend radially from the connectors at the interior of the tank near the bottom wall toward the side walls. The plate can be readily mounted to the outside of the bottom wall of a new or existing processing vessel without the necessity of disassembling the entire vessel. Moreover, the manifold assembly and the conduits can be readily disassembled for repair or replacement purposes.

What is claimed is:

1. In a material processing vessel including a tank having side walls and a bottom wall, said bottom wall having an opening therein, an apparatus comprising:
   a plate detachably mounted in sealing engagement to the outside of said bottom wall over said opening,
   a plurality of connectors fixedly mounted on said plate, said plate having a plurality of holes and said connectors extending through said holes and fixedly connected in sealing engagement to said place,
   mounting means for mounting said plate to the outside of said bottom wall, and
   a plurality of perforated conduits connected to said connectors and extending radially from said connectors at the interior of said tank near said bottom wall toward said side walls.

2. Apparatus according to claim 1, further including a manifold connected in fluid communication with the connectors.

3. Apparatus accordng to claim 2, wherein said manifold is composed of a transparent plastic material to serve as a sight glass.

4. Apparatus according to claim 2, wherein said manifold includes a tubular cylindrical inner wall, a tubular cylindrical outer wall surrounding said inner wall, and a bottom wall fixedly connected to said inner wall and said outer wall and having an aperture aligned with said inner wall, said plate having an aperture aligned with said inner wall and fixedly connected to said outer and said inner walls to form the top wall of said manifold, whereby said inner walls define a passageway communcating with the interior of said tank.

5. Apparatus according to claim 4, wherein said bottom wall of said tank is dish-shaped, and said plate is annularly shaped, said outer wall having an annular flange fixedly connected to and surrounding said outer wall, said mounting means comprising an annular plate fixedly connected to the outside of the bottom wall of the tank and means for detachably connecting said connector plate and said flange to said annular plate of said mounting means.

6. Apparatus according to claim 2, wherein a plurality of connector conduits connect said connectors in fluid communication with said manifold, and said mounting means comprises an apertured plate fixedly connected to the outside of the bottom wall of said tank and means for detachably connecting the connector plate to said apertured plate.

7. Apparatus according to claim 6, wherein said bottom wall of said tank is conically shaped, and said apertured plate is annularly shaped and the connector plate is annularly shaped, and further including a pipe having a flange connected to said connector plate over the opening therein to provide a passageway for communicating with the interior of said tank.

8. Apparatus according to claim 1, wherein said connectors each comprise a tubular member having an internal shoulder and an internal peripheral groove intermediate the shoulder and the conduit-receiving end of the connector for receiving a resilient O-ring.

9. Apparatus according to claim 1, wherein said connectors each comprise a conduit extending through said holes in said plate and a T connector fixedly connected in fluid communication to the conduit and detachably connected in fluid communication with one of said perforated conduits, and further including a series of perforated L-shaped conduits fixedly connected in communication with said T connectors, said L-shaped conduits having a portion extending parallel to said plate and having another portion extending perpendicularly with respect to said connector plate and terminating near said connector plate.

References Cited

UNITED STATES PATENTS

| 2,364,775 | 12/1944 | Brice | 210—291 X |
| 2,643,772 | 6/1953 | Martin | 210—289 X |
| 3,291,311 | 12/1966 | Pratt et al. | 210—289 X |
| 3,391,707 | 7/1968 | Riley et al. | 210—289 X |

SAMIH N. ZAHARNA, Primary Examiner

U.S. Cl. X.R.

210—289

UNITED STATES PATENT OFFICE
CERTIFICATE OF CORRECTION

Patent No. 3,532,216             Dated October 6, 1970

Inventor(s) JAMES F. ZIEVERS and ALLEN E. CEDERHOLM

It is certified that error appears in the above-identified patent and that said Letters Patent are hereby corrected as shown below:

Column 1, line 13, "manifeld" should read -- manifold --; line 20, "engagemen" should read -- engagement --; line 65, after "can be" insert -- readily --. Column 3, line 1, "644,525" should read -- 664,525 --; line 70, "lower most" should read -- lowermost --. Column 4, line 3, "by way" should read -- by any --. Column 7, line 23, claim 1, "place" should read -- plate --.

Signed and sealed this 22nd day of June 1971.

(SEAL)
Attest:

EDWARD M. FLETCHER, JR.
Attesting Officer

WILLIAM E. SCHUYLER, JR.
Commissioner of Patents